Aug. 17, 1954 R. B. HALE 2,686,633
COMBINED CALCULATING AND PLOTTING DEVICE
Filed April 19, 1951 4 Sheets-Sheet 1
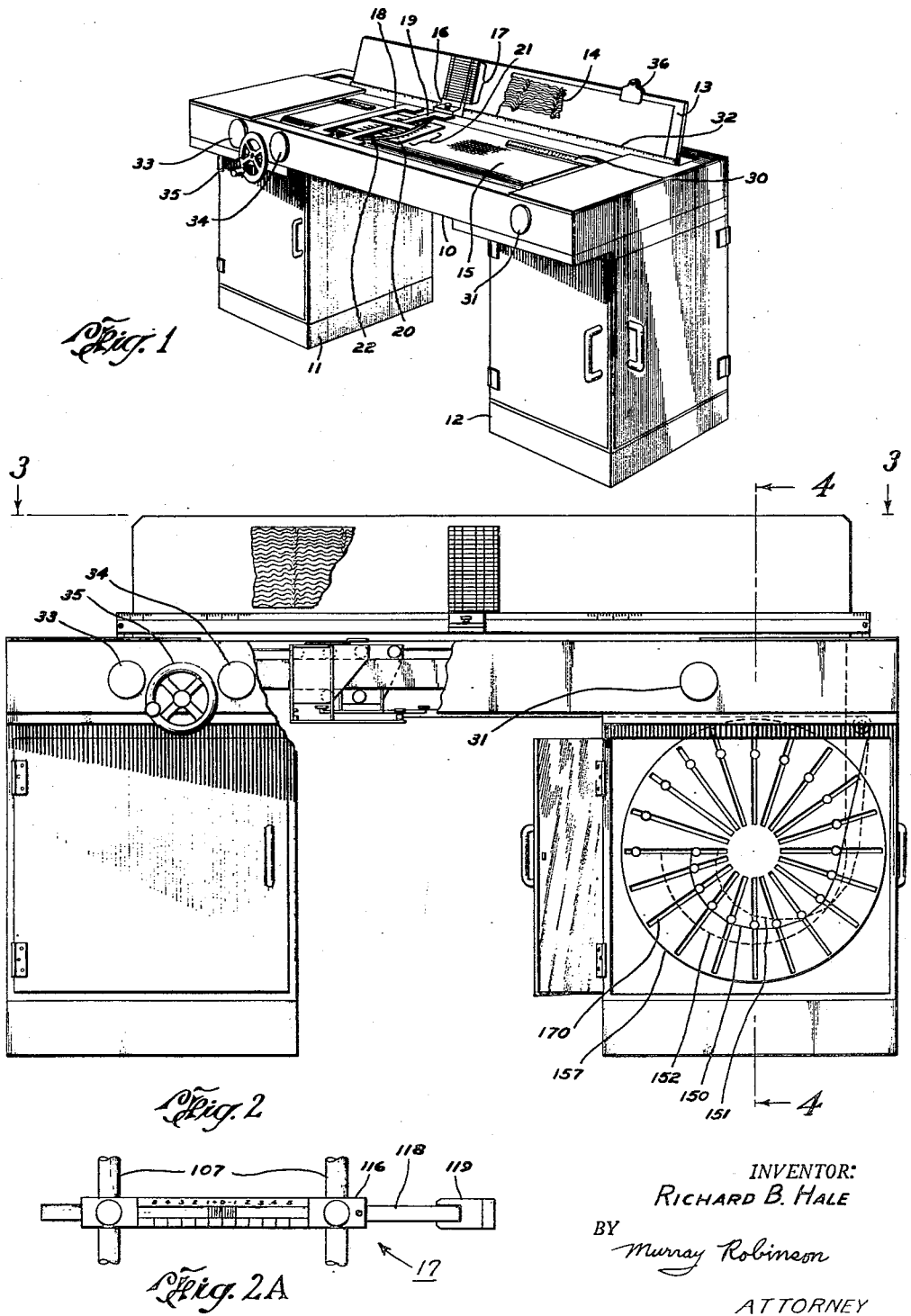
INVENTOR:
RICHARD B. HALE
BY
Murray Robinson
ATTORNEY

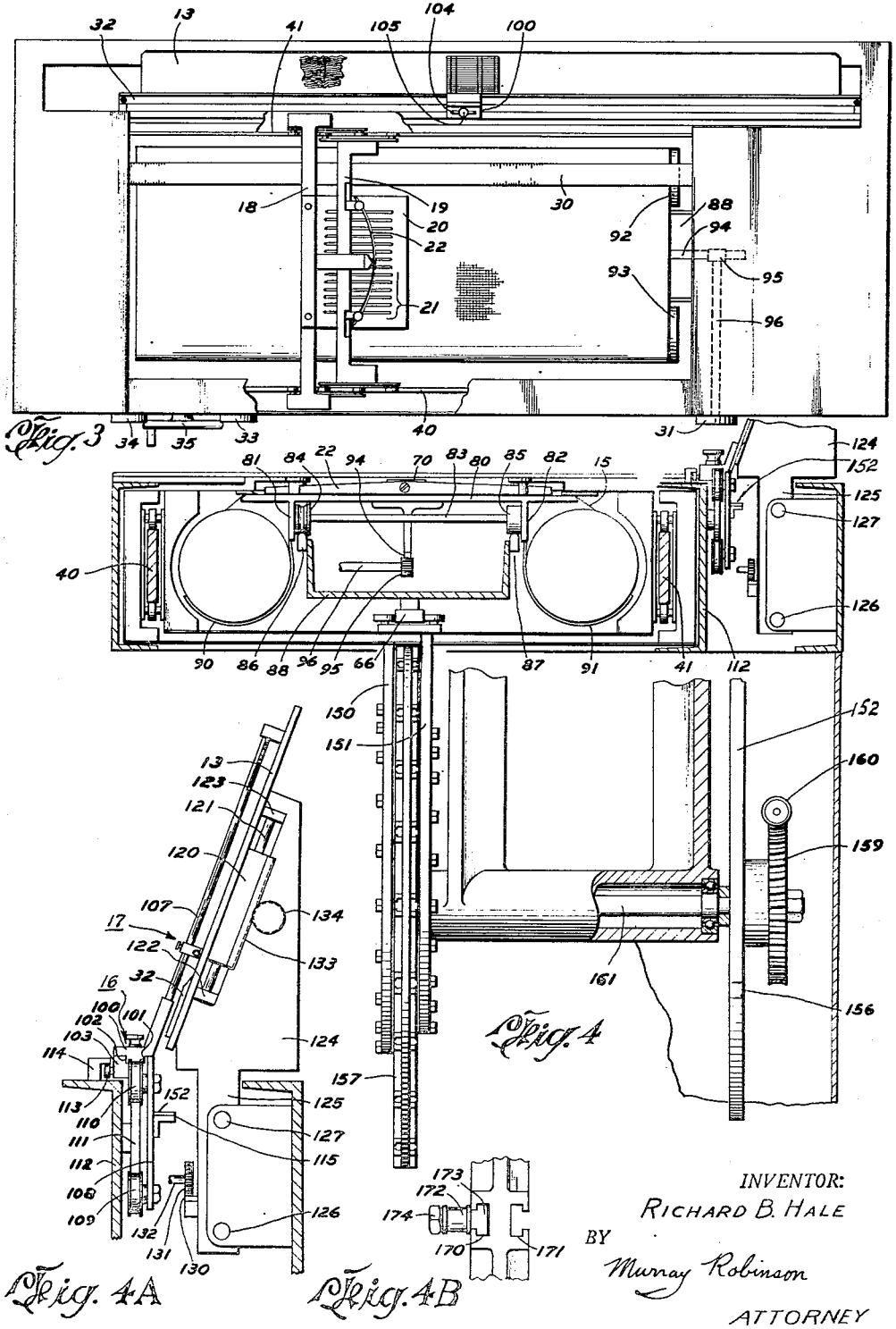

Aug. 17, 1954        R. B. HALE        2,686,633
COMBINED CALCULATING AND PLOTTING DEVICE
Filed April 19, 1951        4 Sheets-Sheet 3
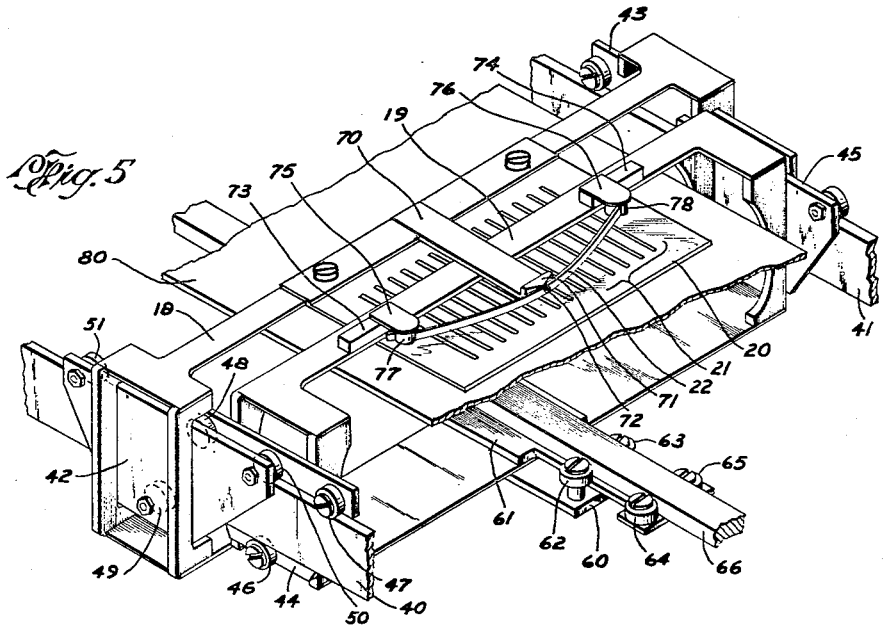
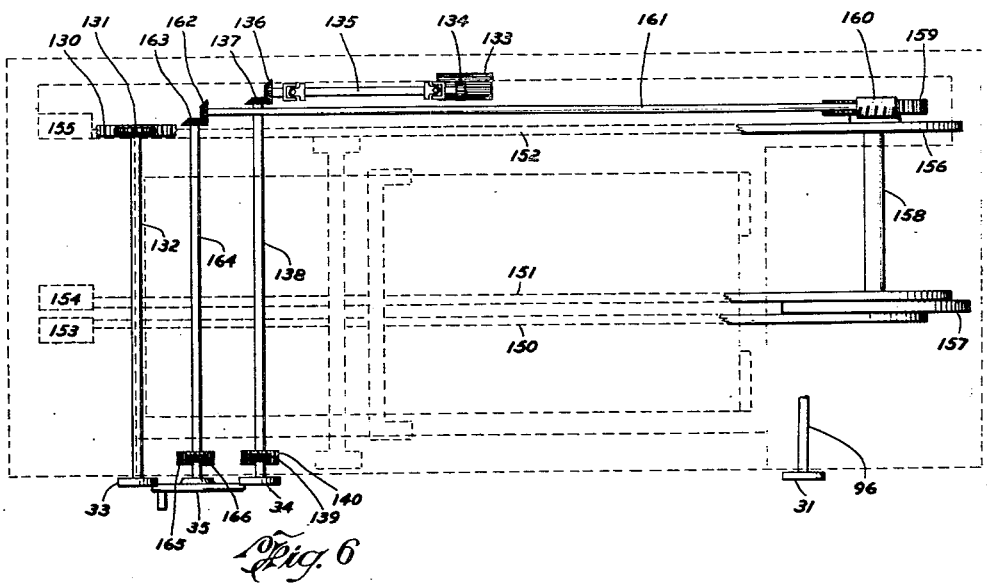
INVENTOR:
RICHARD B. HALE
BY
Murray Robinson
ATTORNEY

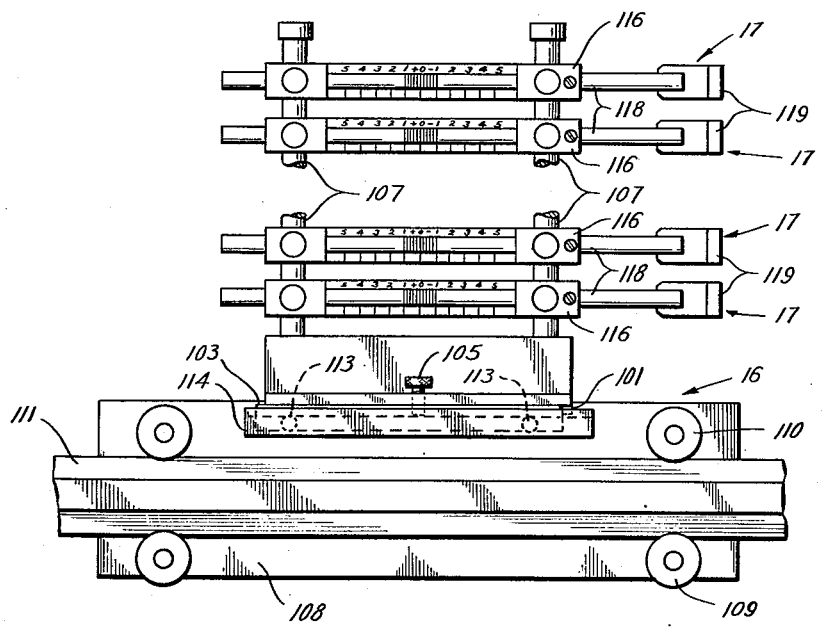

Patented Aug. 17, 1954

2,686,633

UNITED STATES PATENT OFFICE 2,686,633

COMBINED CALCULATING AND PLOTTING DEVICE

Richard B. Hale, Tyler, Tex.

Application April 19, 1951, Serial No. 221,787

14 Claims. (Cl. 235—61)

This invention pertains to a combination calculating and plotting device.

The principal object of the invention is to provide such a device for calculating the depth of formation from a seismogram or time-amplitude graph produced in reflection seismic exploration of the earth's crust and assisting the operator in plotting the depth on a graph of depth against surface position forming an element of a profile map or vertical section through the earth.

A further object of the invention is to produce such a device which is inexpensive to construct and maintain, simple to operate and repair, and reliable, accurate and efficient in operation.

Other objects and advantages of the invention will appear from the following detailed description of a preferred embodiment of the invention, reference being had to the accompanying drawings wherein:

Figure 1 is perspective view of a device embodying the invention;

Figure 2 is a front view thereof, partly broken away to show two of the plotting carriages and having one of the cabinet doors open to show the calculating wheel;

Figure 2-A is a detail of one of the index fingers;

Figure 3 is a plan view of the device;

Figure 4 is a sectional view taken along the line 4—4 of Figure 2;

Figures 4-A and 4-B are enlargements of portions of Figure 4;

Figure 5 is a detail perspective view of the plotting carriage; and

Figure 6 is plan view of the operating controls for the device, the rest of the device being omitted or indicated in dotted lines.

Figure 7 is a front view of the indexing carriage and associated parts.

Referring now to Figure 1 there is shown the general disposition of the parts of the assembled device. The top 10 rests on two cabinet type supports 11 and 12. At the top rear of the device is a plate 13 for supporting a seismogram, a fragment of the latter being shown at 14. Within the top is carried a scroll of plotting paper 15.

An indexing carriage 16 carrying a plurality of vertically and longitudinally adjustably positioned index fingers 17 is arranged to move horizontally along the length of the table, carrying the fingers over the seismogram. A pair of plotting carriages including the primary carriage 18 and the warp carriage 19 are also arranged to move horizontally along the length of the table, the primary carriage carrying the template 20 having a plurality of longitudinal slits 21 therein and also carrying the bow spring 22 extending transversely across the template. The position of the ends of the bow spring is controlled by the warp carriage, and depending on the longitudinal spacing of the plotting carriages, the spring will be more or less bowed.

A longitudinally extending scale 30 is fixed to the top of the table. By means of control knob 31 the paper scroll can be moved longitudinally relative to the scale 30. A longitudinally extending scale 32 is fixed to the top of the table in front of the seismogram. By means of control knob 33 the plate 13 can be moved longitudinally relative to the scale 32. By means of control knob 34 the plate 13 can be shifted vertically relative to the fingers 17. For moving the carriages 16, 18 and 19 longitudinally, suitable drive means is provided which is controlled by hand wheel 35.

In operation, the seismogram is secured to plate 13, for example by means of clamps 36. The vertical spacing of the fingers 17 is adjusted to conform to the spacing of the quiescent traces on the seismogram. The longitudinal position of each finger is adjusted to take account of such factors as the surface elevation of the seismic receiver which produced the particular curve to be traced with the finger, the weathering of the surface adjacent the receiver, and other minor corrections as explained more fully hereafter. The drive means controlled by the handwheel 35 is adjusted to take care of such factors as the assumed velocity variation with depth in the earth at the locality being explored.

The handwheel 35 is then turned until the ends of the fingers 17 are brought over a particular series of curve excursions on the seismogram. The longitudinal or time scale on the seismogram in this region is aligned with the scale 32 by means of knob 33. This adjustment takes care of expansion and contraction of the seismogram and variations in the camera speed, the time scale being photographically produced on the seismogram film at the same time as the seismographic curves. The longitudinal or depth scale on the scroll 15 in the vicinity of the intersection of slots 21 and spring 22 is then aligned with scale 30 by means of knob 31. This adjustment takes care of expansion and contraction of the paper. The device is thus set for plotting the series of depths corresponding to the selected series of excursions representing time on the seismogram. The end of each of the fingers 17 is then successively brought into exact alignment with the ordinate passing through the peak or other selected part of the excursion of the particular curve to which the finger corresponds. This is accomplished by means of vertical adjustments with knob 34 and longitudinal adjustments with hand wheel 35. After each finger is brought into alignment, a mark is made with a pencil or other sharp pointed instrument at the intersection of the bow spring and the particular slot 20 corresponding to the finger; i. e. the front slot for the lowermost finger, the next to the front slot for the next to the lowermost finger, etc. The foregoing procedure will be repeated, including the scale alignments, for any set of excursions on the oscillogram.

Referring now to the other figures of the drawing, there are shown the details of the driving and supporting means for the elements of the device above described.

As best shown in Figure 5, to support the plotting carriages 18 and 19 there are provided longitudinal tracks 40 and 41. Each carriage is a rectangular frame and the sides of the frames have secured thereto plates 42, 43, 44, 45, on each of which are pivotally mounted three wheels such as those indicated at 46, 47 and 48 on plate 44, and 49, 50 and 51 on plate 42, which are disposed above and below the tracks to prevent vertical motion of the carriages. To the bottoms of the rectangular carriage frames are secured plates 60 and 61, the plate 60 being secured to carriage 18 and plate 61 being secured to carriage 19. Plate 60 carries a pair of rollers 62, 63, and plate 61 carries a pair of rollers 64, 65. These pairs of rollers engage rail 66 to guide the carriages and prevent transverse horizontal motion of the carriages.

Fixed to the top of the frame of carriage 18 is a longitudinally extending arm 70 having a curved or pointed end 71 to which is secured spring 22 by means of screw 72. Fixed to the top of the frame of carriage 19 are a pair of blocks 73, 74, to the tops of which are fixed arms 75, 76. Pivotally mounted beneath arms 75, 76 are stub shafts 77, 78, each of which has a horizontal slot therein to slidably receive an end of the spring 22.

The rectangular frames of the carriages 18 and 19 are large enough to pass over the scroll 15 of plotting paper, and the plotting board 80 which supports the exposed portion of the scroll. This is best shown in Figure 4, to which reference will now be made. Secured to the bottom of board 80 are vertical ribs 81 and 82 which carry a plurality of transverse shafts such as that shown at 83 on which are pivotally mounted wheels such as those shown at 84 and 85 running on tracks 86 and 87. The wheels on the front side of the board are hollow ground as illustrated by wheel 84 and the upper edge of track 86 is corelatively curved to fit in the wheel so that transverse motion of the board is prevented. The tracks 86 and 87 are secured to longitudinal beam 88 which also supports the guide rail 66.

Curved plates 90 and 91 provide troughs for supporting the rolls of the paper scroll 15. These plates are supported by the ribs 81 and 82. Friction between the paper and the troughs and the board 80 enables the paper to be stretched tightly over the board 80 by turning the protruding ends 92, 93 of the paper rolls shown in Figure 3. A bar 94 secured to the underside of board 80 is provided with rack teeth on its underside engaging pinion 95 on the end of shaft 96 which may be turned by control knob 31. Through this means the entire paper carriage comprising board 80, ribs 81, 82, and the supporting shafts and wheels carried thereby, and the troughs 90, 91, for the rolls of the paper scroll can be moved longitudinally relative to scale 30.

As best shown in Figure 4-A the indexing carriage 16 comprises a body 100 which has a longitudinal key 101 that slides in a correlative keyway 102 in the top of block 103. Body 100 has a longitudinal slot 104 (see Figure 3) through which passes a screw 105 which fits in threaded hole in the block 103 to adjustably secure the body to the block. Body 100 carries a pair of rods such as that shown at 107 on which the fingers 17 are longitudinally and vertically adjustably positioned. A flange 108 depending from block 103 carries a plurality of wheels such as those shown at 109, 110 pivotally mounted thereon. These wheels are hollow ground and engage the top and bottom edges of track 111 which is secured to channel iron 112 which runs the length of the device. To prevent the body from tipping over it also carries a plurality of wheels such as that shown at 113 pivotally mounted thereon. These wheels run along the top of channel iron 112 and underneath guide rail 114 secured to the top of the channel iron. The indexing carriage is caused to move longitudinally of the device along the track 111 and guide rail 114 by means of arm 115 which is connected to the drive means controlled by the hand wheel 35.

Referring to Figure 2-A, each finger 17 comprises a block 116 having a pair of vertical holes therein to fit over the rods 107. The block is slidable on the rods 107 to provide for vertical adjustment of the finger and is held in adjusted position by means of set screws as shown. There is a longitudinal hole through each block in which is supported a rod 118. The rod 118 is slidable in the block 116 to provide for longitudinal adjustment of the finger and may be frictionally retained in adjusted position or clamped by a set screw. To the end of the rod 118 is secured a chisel shaped index piece 119 providing at its end a vertical index line. A window opening is cut in the block 116 so that the longitudinal position of the rod 118 can be gaged by means of a reference mark on the rod and a scale provided on the edge of the window as shown in the drawing.

Referring again to Figure 4-A, the plate 13 which holds the seismogram has a plurality of sleeve bearings such as that shown at 120, secured to the back thereof. These bearings slide on shafts such as that shown at 121 which are secured at their ends to bars 122 and 123 running longitudinally and connected at their ends to triangular plates such as that shown at 124. The triangular plates have vertical tongues, as shown at 125, which are provided with bearing apertures to slide on longitudinal shafts 126, 127 held between plates secured to the framework of the device. The plate 13 is thus free to slide both longitudinally and approximately vertically. Longitudinal motion is imparted by means of rack 130 secured to the tongues 125 and driven by pinion 131 on the end of shaft 132 which is turned by control knob 33. To impart vertical motion to the plate 13, a wide rack 133 is secured to the back of the bearings 120 and driven by pinion 134. Referring to Figure 6, the pinion 134 is secured to shaft 135 which includes a pair of universal joints and to the other end of which is secured a miter gear 136 meshing with miter gear 137 on the end of shaft 138 which carries gear 139 on its other end meshing with pinion 140 turned by control knob 34.

The driving means for the two plotting carriages 18, 19 and the indexing carriage 16 comprises the three steel tapes 150, 151, 152, which are connected at their left ends to spring reels 153, 154, 155. As shown in Figure 4, tapes 150 and 151 are secured to the under side of carriages 18 and 19 and tape 152 is secured to arm 115 (see also Figure 4-A) of the block 103 of the indexing carriage. The right end of tape 152 is wound on drum 156 which is of uniform radius. The right ends of tapes 150 and 151 are wound on calculating wheel 157. Drum 156 and wheel 157 are secured to shaft 158 on one end of which is worm wheel 159 which meshes with worm 160 on the end of shaft 161 (see Figure 6). To the other end of shaft 161 is secured miter gear 162 which meshes with miter gear 163 on the end of shaft 164. The other end of shaft 164 carries gear 165 which is driven by pinion 166 that is turned by handwheel 35.

Referring now to Figures 2, 4, and 4-B, the calculating wheel 157 has a plurality of equally spaced radial spokes each having a pair of grooves, such as shown at 170, 171 on opposite sides thereof. A pin such as that shown at 172 having a T head 173 is slidably disposed in each groove and can be secured in any desired position by tightening up nut 174 that screws on to the threaded end of the end of the pin. The tapes 150, 151 are wound around rollers on the pins 172 so that the winding radius of these tapes varies according to the angular position of the calculating wheel and the position of the pins. These pins are set in such position that the movement of the warp spring carried by the plotting carriages is related to the movement of the indexing carriage according to the same function that relates the corrected down time determined from the seismogram to the depth of the point of reflection and which function takes account of the variation of velocity with depth as previously mentioned. This can be stated more explicitly after a description of the theory of operation of the device.

According to one view of the device, the warp spring is made to assume the shape and position of the vertical section through the wave front of the seismic disturbance at the time of reflection, reduced of course to the scale of the profile map on which the depths are indicated. The intersection of this wave front with the medial plane between source of disturbance and detector, represented in section by the slot in the plate supported by the primary carriage, is the point of reflection if the reflecting formation is horizontal and is an approximation thereto if the formation dips. By changing the slot positions the device can be adjusted to plot depths of points of reflection from inclined formations.

In an isotropic region, the wave front sections are arcs of circles with a fixed center at the source of disturbance. In such case the pins would be set so that the radius of action $P$ of the tape driving the primary carriage would be related to the radius of action $R$ of the tape driving the indexing carriage according to the relation $$P = CR$$

where $C$ is a constant depending on the velocity of transmission and the relative scales of the map and seismogram. Since the radius $R$ of the drum on which the tape for the indexing carriage is wound is constant, the pins on which the tape for the primary carriage is wound should be set at uniform distances $P$ from the center of the calculating wheel.

The foregoing relation between $P$ and $R$ is derived from the function $$h = vt/2$$

where $h =$ depth of unreflected wave front directly beneath of disturbance at time of reflection.

$v =$ velocity of transmission of disturbance.

$t =$ time of reception, at source of disturbance, of wave reflected from a horizontal formation measured from time of start of disturbance.

Differentiating, $$dh = (v/2)dt$$

Since $$dh = aPdx$$

and $$dt = bRdx$$

where $x =$ angular displacement of calculating wheel and drum, $a =$ scale of map, and $b =$ scale of seismogram.

Therefore $$aPdx = (v/2)bRdx$$

and $$P = CR$$

where $$C = vb/2a$$

In the above considered case of an isotropic region the pins on which is wound the tape driving the warp carriage would be set so that $$W = (2aP^2x)(a^2P^2x^2 - a^2m^2)^{-1/2}$$

where $W =$ radius of action of the tape driving the warp carriage.

$m =$ perpendicular distance from point of contact of warp spring with warp carriage to line drawn longitudinally through point of contact of warp spring with primary carriage.

This relation is derived from the equation $$s = h \cos \arc \sin (am/h)$$

where $s =$ vertical distance from horizontal datum plane through source of disturbance to wave front at a point lying in plane spaced a disturbance $am$ from source of disturbance.

The last mentioned equation may also be expressed in the Pythagorean form $$s = (h^2 - a^2m^2)^{1/2}$$

Then $$ds = (h^2 - a^2m^2)^{-1/2}(2h)dh$$

$$ds = aWdx$$

$$dh = aPdx$$

$$h = aPx$$

$$W = P(2aPx)(a^2P^2x^2 - a^2m^2)^{-1/2}$$

In a region where the velocity of propagation increases linearly with depth according to the relation $$V = u + Rh$$

where $u$ = surface velocity, the wave front sections are arcs of circles with radius $q$ and centers disposed at a depth $z$ directly below the source of disturbance where $$z = (u/k)(\cosh kt/2) - (u/r)$$
$$q = (u/k)(\sinh kt/2)$$

and $$H = z + q$$

In this case the pins on the calculating wheel can be set to position and curve the warp spring in accordance with the relations between $t$, $h$ and $s$ in a manner similar to that outlined for the case of an isotropic medium. It is to be noted that in the present case however the radius P will vary with the angle $x$.

With other velocity functions of depth, the wave front sections may not be circular but can at least be closely approximated in any given region by a circular wave front section and the pins on the calculating wheel can be set to reproduce such an approximate wave front. It is to be noted that the warp spring will always assume a shape approximating an arc of a circle due to the mode of its mounting.

According to another view of the device, the primary carriage is caused to move in such relation to the indexing carriage as to locate a point at a depth $d'$ corresponding to purely vertical travel of the wave in the time $t/2$ and the warp carriage is caused to move in such relation to the primary carriage as to produce an arc of a circle which intersects the slots of the plate supported on the primary carriage in such a way as to automatically reduce the depth $d'$ to the depth $d$ at the point of reflection by subtracting a distance $g(1-\cos y)$ where $$y = \arcsin(f/2ga)$$

and $f$ = horizontal distance between source of disturbance and vertical plane through receiver; $g/a$ = radius of circle of warp spring and the angle $y$ is the angle of incidence of the wave front at the point of reflection. This view assumes a ray path that is vertical to depth $d'-g$ and then inclined to the point of reflection, which is an approximation to the actual curved path of the ray. In the isotropic case $g = d' = h$ and in the linear velocity—depth relation case $g = q$.

As stated previously corrections for differences in surface elevation of the various receivers or detectors is made by longitudinal adjustment of the fingers on the indexing carriage. This has the effect of reducing or increasing the total time indicated on the seismogram by the amount of time required for the disturbance to travel from the elevation of a selected datum plane up or down to the particular receiver. The adjustment of the fingers also takes care of the time required for the disturbance to travel from the datum plane to the shot or source of disturbance. Further adjustment may be made to introduce time corrections to care for the marked difference between the velocity of propagation in the weathered layer and the underlying unweathered portion of the earth's crust and other surface velocity effects. In short, the longitudinal adjustment of the fingers takes care of the algebraic sum of all the small corrections that can be made by adding or subtracting small constant amounts of time to or from the total elapsed time indicated by the seismogram. In this way the observed time is changed to the corrected time on which is based the pin settings of the calculating wheel for reproducing the wave front over the map.

In the claims appended to this description of the invention certain generic terms are used which have only representative as distinguished from all inclusive antecedents in the specification. Broadly, the plate 13 is a support for a seismogram. The seismogram support and the time scale 32 are movable longitudinally relative to each other. The paper carriage including the plotting table 80 constitutes a support for the plotting paper on which the profile map is drawn. The map support and the depth scale 30 are movable longitudinally relative to each other. The depth scale and time scale are fixed relative to each other, being tied together by the frame of the device to which they are both attached.

A means for locating a point on or indexing relative to a seismogram curve includes the indexing carriage 16 and one of the fingers 17, the latter bearing reference lines or indicia movable both longitudinally and transversely (vertically) relative to the indexing carriage. The means for indexing relative to a seismogram curve, and the seismogram support, respectively, are movable both longitudinally and transversely (vertically) relative to each other. A means for locating a point on the map comprises the plotting carriages 18 and 19 and the spring 22 and one of the slots 21. The spring constitutes a warpable reference line. Since the plate 20 is removably connected to the primary carriage 18 and other plates having different spacing are provided which may be substituted therefor, the plates are equivalent to a plurality of individual plates each having one slot and transversely adjustable relative to the primary carriage (which arrangement could be used if desired) and may be said to constitute parallel longitudinally disposed reference lines of selectable transverse spacing intersecting the warpable reference line. The means for indexing relative to a seismogram curve and the means for locating a point on the map are tied together by coupling means which includes the tapes, the calculating wheel, the drum, and the shaft connecting the wheel and drum. This coupling means is primarily linear because of the constant angular velocity ratio of the wheel and drum but includes the adjustable pins on the calculating wheel which provide adjustable means for introducing a nonlinear component to the coupling means.

Viewed broadly the device comprises two relatively movable sections. For convenience one may be termed a stationary section and the other a movable section. The stationary section comprises the seismogram and map supports and the time and depth scales. The movable section comprises the means for indexing relative to a seismogram curve, the means for locating a point on the map, and the coupling means. The stationary section and the movable section are connected together by means of the bearings for the common shaft on which the calculating wheel and drum are mounted.

The shafts and gearing and control knobs and hand wheel shown in Figure 6 provide manual means for adjusting the relative positions of the various relatively movable elements and groups of elements set forth above.

Viewed in another light the device comprises a transmitter including the seismogram support and means for locating a point on the seismogram or indexing relative thereto, and a receiver including the map support and means for locating a point on the map. Relative movement of the transmitter elements causes relative movement of the receiver elements by virtue of the coupling means therebetween comprising the supporting framework, the tapes, the calculating wheel, the drum, and the shaft connecting the wheel and drum.

While a preferred embodiment of the invention has been shown and described, it is obvious that many modifications thereof can be made by one skilled in the art without departing from the spirit of the invention and it is desired to protect by Letters Patent all forms of the invention falling within the scope of the following claims.

I claim:

1. A combined calculating and plotting device for translating a seismogram into a profile map comprising a first section including a seismogram support and a map support; a second section; and means for mounting said sections for relative movement therebetween; said second section including means for locating a point on a seismogram curve, means for locating a point on a map, and means coupling said locating means together to cause motion of the second said locating means relative to said map support upon motion of the first said locating means relative to said seismogram support; and said coupling means being adjustable to provide any desired movement of the second said locating means as a function of the movement of the first said locating means, said coupling means being wholly mechanical.

2. A device for translating a seismogram into a profile map comprising a stationary section and a movable section and means for mounting said sections for relative movement therebetween, said stationary section including a frame, a time scale fixed to the frame, a depth scale fixed to the frame, a seismogram support adjustably mounted on the frame for longitudinal movement relative to the time scale, and a map support separate from the seismogram support and adjustably mounted on the frame for longitudinal movement relative to the depth scale, said movable section including means for locating a point on a seismogram curve placed on the seismogram support, means for locating a point on a map placed on the map support and means coupling said locating means together to cause motion of the second said locating means relative to said map support upon motion of the first said locating means relative to said seismogram support, said coupling means being primarily linear but including adjustable means to introduce a non-linear component therein.

3. A device for translating a seismogram into a profile map comprising a stationary section and a movable section and means for mounting said sections for relative movement therebetween, said stationary section including a frame, a time scale fixed to the frame, a depth scale fixed to the frame, a seismogram support adjustably mounted on the frame for longitudinal movement relative to the time scale, and a map support separate from the seismogram support and adjustably mounted on the frame for longitudinal movement relative to the depth scale, said movable section including means for locating a point on a seismogram curve placed on the seismogram support, means for locating a point on a map placed on the map support, and means coupling said locating means together to cause motion of the second said locating means relative to said map support upon motion of the first said locating means relative to said seismogram support, said coupling means being primarily linear but including adjustable means to introduce a non-linear component therein, and means to adjust the position of the first said locating means relative to said seismogram support transversely to the time scale.

4. A device for computing seismograms comprising a seismogram support, a map support, an indexing carriage movably mounted relative to the seismogram support, means carried by the indexing support to locate a point on a seismogram placed on the seismogram carriage, a pair of plotting carriages including a primary carriage and a warp carriage movably mounted relative to the map support, the primary carriage carrying means defining a plurality of parallel reference lines and means defining a transverse reference line, the last said means being warpable to variably curve the line defined thereby, the warp carriage being connected to the warpable means, and coupling means interconnecting the indexing carriage and the plotting carriages, said coupling means being primarily linear but including a non-linear component to produce at least relative motion between the primary and warp carriages as the indexing and plotting carriages are moved relative to the supports to change the curvature of said means defining the transverse reference line.

5. A device for computing seismograms comprising a seismogram support, a map support, an indexing carriage movably mounted relative to the seismogram support, a plurality of means defining parallel reference lines carried by the indexing carriage, means to adjust the positions of each of the first said plurality of means relative to the carriage in directions both parallel to and transverse to the lines defined by said means, a pair of plotting carriages including a primary carriage and a warp carriage movably mounted relative to the map support, the primary carriage carrying means defining a plurality of reference lines of selectable transverse spacing, means defining a transverse reference line, the last said means being warpable to variably curve the line defined thereby, the last said means being connected at the middle to said primary carriage, the warp carriage being slidably connected to the ends of the last said means, and coupling means interconnecting the indexing carriage and the plotting carriages, said means being primarily linear but including adjustable means to introduce a desired non-linear component to produce at least relative motion between the primary carriage and warp carriage as the indexing and plotting carriages are moved relative to the supports to bend the warpable means to define an arc of a circle of radius predetermined according to the position of the indexing carriage.

6. A combined calculating and plotting device for translating a seismogram into a profile map comprising a first section including a seismogram support and a map support; and a second section including means for locating a point on a seismogram curve, means for locating a point on a map, and means coupling said locating means together to cause motion of the second said locating means relative to said map support upon motion of the first said locating means relative to said seismogram support; and means for mounting said sections for relative movement therebetween; said coupling means being adjustable to provide any desired movement of the second said locating means as a function of the movement of the first said locating means, said coupling means including a constant angular velocity connection between the first and second said locating means, said connection having independently adjustable radii of action with respect to the second said locating means.

7. A combined calculating and plotting device for translating a seismogram into a profile map comprising a first section including a seismogram support and a map support; and a second section including means for locating a point on a seismogram curve, means for locating a point on a map, and means coupling said locating means together to cause motion of the second said locating means relative to said map support upon motion of the first said locating means relative to said seismogram support; and means for mounting said sections for relative movement therebetween; said coupling means being adjustable to provide any desired movement of the second said locating means as a function of the movement of the first said locating means, said coupling means including a rotatably mounted body, a plurality of guides secured to the body at angularly spaced positions about the axis of rotation, means to adjust the radial distances of the guides from said axis of rotation, and a flexible member wound on said body adjacent said guides, said flexible member being connected to one of said locating means, and means connecting the other of said locating means to said body.

8. A device for computing seismograms comprising a seismogram support, a map support, an indexing carriage movably mounted relative to the seismogram support, means carried by the indexing carriage to locate a point on a seismogram placed on the seismogram support, a pair of plotting carriages including a primary carriage and a warp carriage movably mounted relative to the map support, the primary carriage carrying means defining a plurality of parallel reference lines and means defining a transverse reference line, the last said means being warpable to variably curve the line defined thereby, the warp carriage being connected to the warpable means, and coupling means interconnecting the indexing carriage and the plotting carriages, said coupling means being primarily linear but including a non-linear component to produce at least relative motion between the primary and warp carriages as the indexing and plotting carriages are moved relative to the supports to change the curvature of said means defining the transverse reference line, said coupling means including a rotatably mounted body, a track of fixed radius thereon, a flexible member wound on said track and connected to said indexing carriage, a pair of tracks of independently variable adjustable radius, a pair of flexible members wound on said pair of tracks and connected to said plotting carriages, one to the primary carriage and one to the warp carriage, and means connected to all three of said carriages tending to move said carriages in a direction opposite to that in which they move when said flexible members are wound up on said tracks.

9. A combined calculating and plotting device for translating a seismogram into a profile map comprising a first section including a seismogram support and a map support; and a second section including means for locating a point on a seismogram curve, means for locating a point on a map, and means coupling said locating means together to cause motion of the second said locating means relative to said map support upon motion of the first said locating means relative to said seismogram support, the second said locating means comprising means to reproduce over the map an arc portraying a section through the wave front of a seismic disturbance; and means for mounting said sections for relative movement therebetween.

10. A combined calculating and plotting device for translating a seismogram into a profile map comprising a first section including a seismogram support and a map support; and a second section including means for locating a point on a seismogram curve, means for locating a point on a map, and means coupling said locating means together to cause motion of the second said locating means relative to said map support upon motion of the first said locating means relative to said seismogram support, the second said locating means comprising means to reproduce over the map an arc portraying a section through the wave front of a seismic disturbance, and means to reproduce over the map a line portraying a vertical line in the earth through the point of reflection of a seismic disturbance, the intersection of said means to reproduce an arc and line locating the point of reflection whose depth is to be plotted on the map, and means for mounting said sections for relative movement therebetween.

11. A combined calculating and plotting device for translating a seismogram into a profile map comprising a first section including a seismogram support and a map support; and a second section including means for locating a point on a seismogram curve, means for locating a point on a map, and means coupling said locating means together to cause motion of the second said locating means relative to the map support upon motion of the first said locating means relative to said seismogram support, the second said locating means comprising means to reproduce over the map an arc portraying a section through the wave front of a seismic disturbance, and means to reproduce over the map a line portraying a vertical line in the earth through the point of reflection of a seismic disturbance, the intersection of said means to reproduce said arc and line locating the point of reflection whose depth is to be plotted on the map, said coupling means being adjustable to provide any desired movement of the second said locating means as a function of the movement of the first said locating means; and means for mounting said sections for relative movement therebetween.

12. A combined calculating and plotting device for translating a seismogram into a profile map comprising a first section including a seismogram support and a map support; and a second section including means for locating a point on a seismogram curve, means for locating a point on a map, and means coupling said locating means together to cause motion of the second said locating means relative to the map support upon motion of the first said locating means relative to said seismogram support, the second said locating means comprising a primary carriage carrying means defining a plurality of longitudinally disposed spaced parallel reference lines, means defining a transversely disposed reference line representing a section through a wave front produced by a seismic disturbance, the last said means being warpable to variably curve the line defined thereby, the last said means being connected at one part to said primary carriage, the second said locating means also comprising a warp carriage connected to another part of said warpable means, said coupling means being adjustable to provide the desired movement of the primary carriage as a function of the movement of the first said locating means and to provide the desired movement of the warp carriage relative to the primary carriage as a function of the movement of the first said locating means; and means for mounting said sections for relative movement therebetween.

13. A combined calculating and plotting device for translating a seismogram into a profile map comprising a transmitter including a seismogram support and means for locating a point on a seismogram placed on the seismogram support, a receiver including a map support and means for locating a point on a map placed on the map support, and means coupling the transmitter and receiver to cause relative movement of said map support and the second said locating means upon relative movement of said seismogram support and the first said locating means, said coupling means being adjustable to provide any desired relative movement of the second said locating means and map support as a function of the movement of the first said locating means and seismogram support, said coupling means including a constant angular velocity connection between the transmitter and receiver, the radii of action of said connection relative to one of said transmitter and receiver being adjustable.

14. A combined calculating and plotting device for translating a seismogram into a profile map comprising a transmitter including a seismogram support and means for locating a point on a seismogram placed on the seismogram support, a receiver including a map support and means for locating a point on a map placed on the map support, and means coupling the transmitter and receiver to cause relative movement of said map support and the second said locating means upon relative movement of said seismogram support and the first said locating means, said coupling means being adjustable to provide any desired relative movement of the second said locating means and map support as a function of the movement of the first said locating means and seismogram support, the second said locating means comprising means to define an arc corresponding on the map scale to a section through the wave front of a seismic disturbance and means to define a line corresponding on the map to a vertical line through the point of reflection of a seismic disturbance, the intersection of the last said arc and line defining means locating the point on the map corresponding to the depth of the point at which the seismic disturbance was reflected.

References Cited in the file of this patent

UNITED STATES PATENTS

| Number | Name | Date |
| --- | --- | --- |
| 1,489,782 | Newell | April 8, 1924 |
| 1,678,674 | Koenig, Jr. | July 31, 1928 |
| 2,088,533 | Phelps | July 27, 1937 |
| 2,155,507 | Rieber | Apr. 25, 1939 |
| 2,243,730 | Ellis | May 27, 1941 |